US00RE35540E

United States Patent [19]

Davies et al.

[11] E Patent Number: Re. 35,540

[45] Reissued Date of Patent: Jun. 24, 1997

[54] PRODUCT BAG FOR DISPENSING AND METHOD FOR PRODUCING THE SAME

[75] Inventors: Robert J. Davies, Markham; Patrick J. Gleeson, Etobicoke, both of Canada; Michael J. Moran, New Bern, N.C.

[73] Assignee: CCL Industries, Inc., Canada

[21] Appl. No.: 296,145

[22] Filed: Aug. 26, 1994

Related U.S. Patent Documents

Reissue of:

[64] Patent No.: 5,169,037
Issued: Dec. 8, 1992
Appl. No.: 813,775
Filed: Dec. 27, 1991

U.S. Applications:

[63] Continuation-in-part of Ser. No. 692,682, Apr. 20, 1991, Pat. No. 5,137,186, which is a continuation-in-part of Ser. No. 512,167, Apr. 20, 1990, Pat. No. 5,040,704, which is a continuation-in-part of Ser. No. 470,911, Jun. 26, 1990, Pat. No. 5,035,351.

[51] Int. Cl.[6] ..... B65D 83/00

[52] U.S. Cl. ..... 222/402.1; 222/394; 222/386.5

[58] Field of Search ..... 222/402.1, 394, 222/386.5, 94, 130, 80, 82, 389, 105, 399

[56] References Cited

U.S. PATENT DOCUMENTS

| | | | |
|---|---|---|---|
| 4,732,299 | 3/1988 | Hoyt . | |
| 4,969,577 | 11/1990 | Werding | 222/105 X |
| 5,035,351 | 7/1991 | Moran | 222/394 |
| 5,040,704 | 8/1991 | Moran | 222/394 |
| 5,115,944 | 5/1992 | Nikolich | 222/105 X |
| 5,135,137 | 8/1992 | Rudick | 222/105 X |
| 5,137,179 | 8/1992 | Stoffel | 222/105 X |

FOREIGN PATENT DOCUMENTS

| | | | |
|---|---|---|---|
| 0 439 287 A1 | 1/1991 | European Pat. Off. . | |
| 1410846 | 8/1965 | France | 222/402.1 |
| 59-106887 | 7/1984 | Japan . | |
| 59-163166 | 9/1984 | Japan . | |
| 59-187571 | 10/1984 | Japan . | |
| 61-200374 | 12/1986 | Japan . | |
| 3-19858 | 2/1991 | Japan . | |
| 4-53691 | 5/1992 | Japan . | |
| 680849 | 11/1992 | Switzerland | 222/402.1 |
| 8810221 | 12/1988 | WIPO | 222/402.1 |
| 9324392 | 12/1993 | WIPO | 222/105 |

OTHER PUBLICATIONS

"The Aerosol Handbook", Johnson et al., pp. 100–104, Wayne E. Dorland Company.

"Koike Introduces a New Double–Structured Container", Aerosol Industry News, Feb. 25, 1988.

*Primary Examiner*—Lesley D. Morris
*Attorney, Agent, or Firm*—Kenyon & Kenyon

[57] ABSTRACT

A product dispenser include a unique product bag/valve configuration. The product is stored in the product bag. Pressure in the container surrounding the bag determines the dispensing pressure. The valve has a valve extender with a unique shape to enhance sealing the valve to the bag. The product bag includes a gusset along a bottom portion. The gusset opens when product is introduced into the bag. The gusset supports the bag when in contact with a bottom dome shaped portion of the container.

20 Claims, 10 Drawing Sheets

FIG. 5
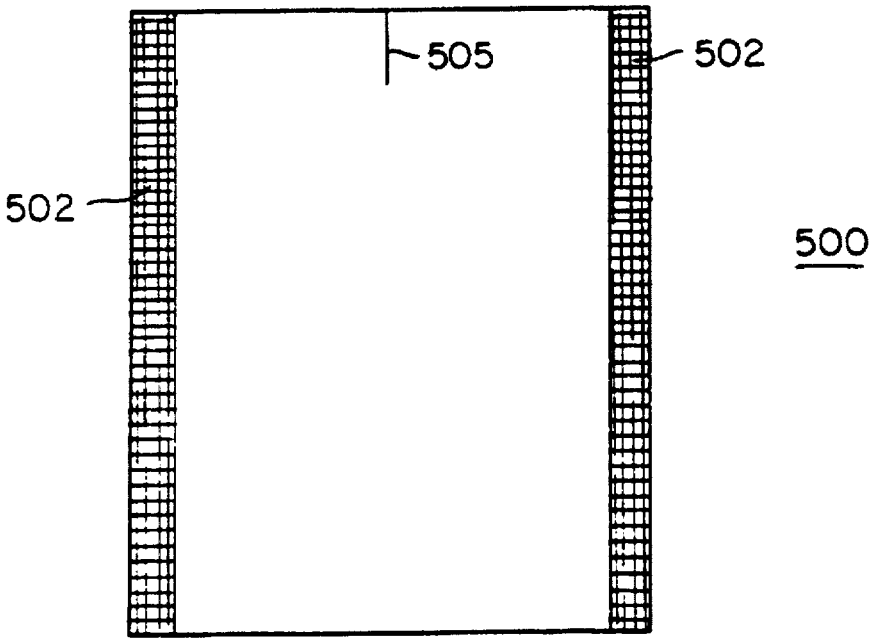
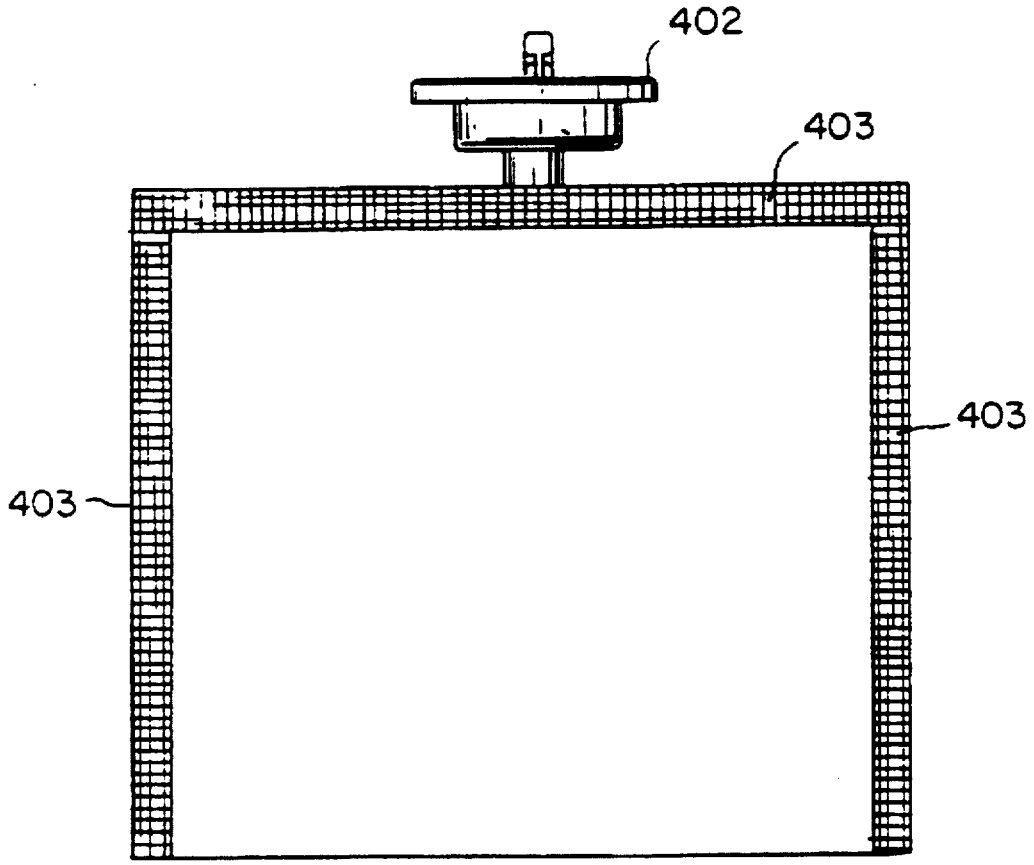
FIG. 4

FIG. 12D
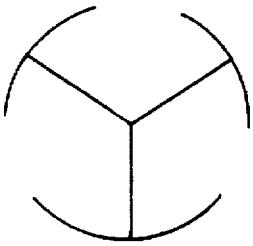
FIG. 12E
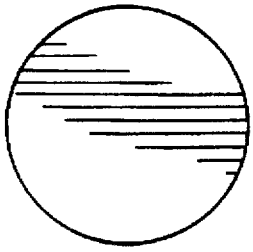
FIG. 12F
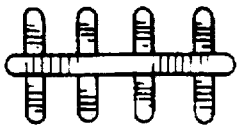
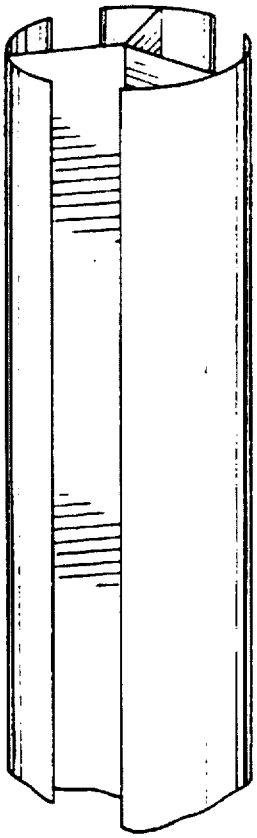
FIG. 12A
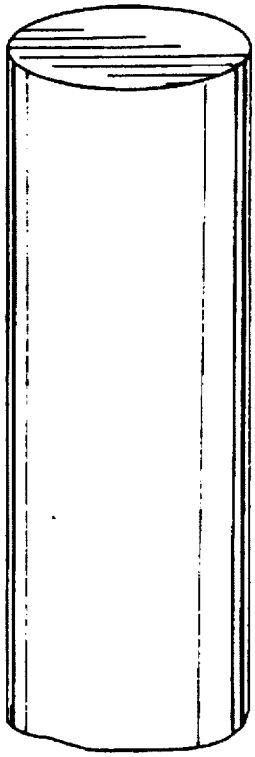
FIG. 12B
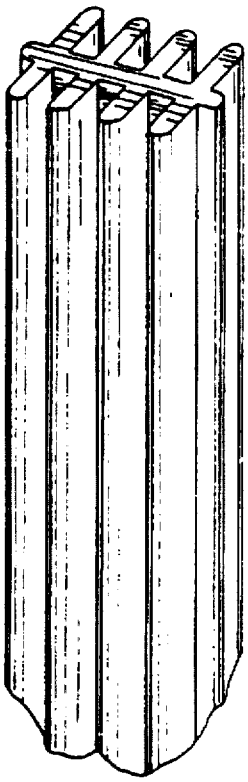
FIG. 12C

PRODUCT BAG FOR DISPENSING AND METHOD FOR PRODUCING THE SAME

Matter enclosed in heavy brackets [ ] appears in the original patent but forms no part of this reissue specification; matter printed in italics indicates the additions made by reissue.

BACKGROUND OF THE INVENTION

This invention is a continuation-in-part of copending U.S. Ser No. 07/692,682 filed on Apr. 20, 1991 entitled METHOD AND APPARATUS FOR DISPENSING PRODUCT FROM A PRODUCT BAG which is a continuation-in-part of copending U.S. Ser. No. 512,167 filed on Apr. 20, 1990 entitled METHOD AND APPARATUS FOR DISPENSING PRODUCT FROM A PRODUCT BAG, now U.S. Pat. No. 5,040,704, which in turn is a continuation-in-part of U.S. Ser. No. 470,911 filed on Jan. 26, 1990 entitled METHOD AND APPARATUS FOR MAINTAINING A PRESSURE WITHIN A PRODUCT DISPENSER, now U.S. Pat. No. 5,035,351.

FIELD OF THE INVENTION

This invention is directed to a product containing bag ("product bag") and method for producing such product bag. In particular, the present invention is directed to a unique product bag assembly for insertion, while unfilled, into a dispensing container where the product bag, a valve connection to the bag and an assembly of the bag and valve enhance the fill capacity and improve the performance of the dispenser.

RELATED ART

Dispensing systems which use pressurized containers are well known. In such systems product to be dispensed is provided in the container. Furthermore the container is charged to a starting pressure. When the dispensing valve is activated a pressure differential between the internal pressure of the dispenser and the ambient pressure results in the dispensing of product from the container.

It is known to provide a product dispenser which uses a product containing bag disposed in a container and to provide a pressure generation mechanism in the container exterior to the bag to apply a pressure to the bag. A dispensing pressure is thus defined by the pressure generation mechanism.

In such a system, typically the bag hangs from a dispensing valve sometimes causing excessive stress on a bag valve interface. Additionally, the product bags are typically stuffed into the can, sometimes subjecting them to stress while being forced through a container opening. Furthermore, the techniques used for attaching the dispensing valve to the product bag may be susceptible to leakage, thus reducing the reliability of the product dispenser.

Thus, the bag construction can be limiting factors in dispenser operability and can sometimes cause pressure to inadvertently be reduced, thereby resulting in erratic performance of the dispensing system.

SUMMARY OF THE INVENTION

The present invention substantially improves on performance and reliability of prior product bags by providing a unique product bag construction which substantially reduces susceptibility to leakage. In this regard, the present invention provides a unique valve attachment for connecting the valve to the product bag. Also the present invention provides a unique cartridge configuration for the bag valve assembly for insertion into a product dispensing container without interference or damage to the bag. The cartridge can include a flow tube extending the length of the product bag and disposed just below the bag exit. The flow tube is used to prevent product from getting trapped in the product bag as the bag collapses.

The cartridge of the present invention can be used in conjunction with many pressurized container configurations. As an example, the cartridge can be inserted in a container that is then provided with a compressed gas and sealed. The pressure differential between the compressed gas and the area external to the container results in product being dispensed from the product bag. Similarly, the compressed gas system could be replaced by a hydrocarbon gas system known in the art.

The present invention further provides that the unique product bag configuration can be used with an improved pressure regulating system which maintains a substantially constant pressure in the dispenser surrounding the product which is contained in a closed bag so that virtually all of the product is dispensed from the bag.

The present invention also provides a unique method for utilizing such a unique product bag to interact with the pressure regulating system as the product bag is filled. In this method, the initial dispensing pressure, and hence the regulated pressure, is set by the process of introducing product into the product bag. This removes the need for complicated initializing operations. The starting dispensing pressure may be determined by the amount of product fill.

In one embodiment of the present invention, a product bag is constructed of a suitable barrier material which may take the form of a gas impervious material. The barrier material is folded along one edge to form a gusseted bottom and is sealed along the other three edges. Along its top edge seal a special wedge shaped valve connector is welded to the inside of the bag. The bag can be rolled into a tubular shape. Furthermore a releasable restraint may be used to maintain the bag in its collapsed rolled state until it is placed in the container and product is injected in to the bag.

The pressure regulating mechanism that can be disposed in the container is not activated until the product is introduced into the product bag. Therefore, a closed dispenser including pressure regulating mechanism and product bag can be transmitted from a dedicated dispenser production assembly area and moved to a different filling location without harm to the pressure regulating system and without harm to the sterile characteristics of the product bag.

The present invention also provides a unique system for regenerating a pressure within a product dispenser. This system is less complex than those known in the prior art. Further, it provides a high degree of assurance that the pressure regenerated after product is dispensed from the container will be substantially equal to an initial or starting pressure of the product dispenser.

Furthermore, according to the present invention, this pressure regulating system can be configured so as to permit product dispensing with an unrestricted orientation of the product dispenser while avoiding loss in product dispensing pressure or interruption of product dispensing.

An apparatus for generating pressure and substantially controlling that pressure while using a product bag made in accordance with the present invention includes a gas generating chamber having a first reactant disposed therein. The apparatus also includes a enclosure that is disposed within the gas generating chamber and which includes walled structure having a permeable opening in at least one portion of the walled structure. The apparatus further includes a second reactant disposed in the enclosure and a first gas that is disposed in the enclosure where the second reactant is disposed between the first gas and the permeable opening. The first and second reactants are selected so that the product of their combination results in generation of a gas. In the apparatus of this embodiment, the size of the permeable opening is such that at a pressure equilibrium (where the pressure within the second enclosure approximately equals a pressure in the gas generating chamber surrounding the enclosure), the surface tension of the second reactant prevents a flow of the reactant through the permeable opening into the gas generating chamber surrounding the enclosure.

According to the method of the present invention, pressure is controlled within a product dispensing container by disposing a first reactant in hollow body that includes an aperture. The hollow body is disposed in the gas generating chamber as well. A start-up pressure is generated in the gas generating chamber where the start-up pressure is greater than an initial pressure in the hollow body, thereby causing a gas to enter the hollow body through the aperture until a pressure equilibrium has been established. At the equilibrium point, the pressure in the hollow body and in the gas generating chamber are substantially equal. The second reactant is forced out of or discharged from the hollow body when a pressure in the gas generating chamber falls below the equilibrium pressure. A compensating pressure is created in the gas generating chamber by a gas formed as a product of the reaction of the second reactant (forced from the hollow body) with the first reactant (disposed in the gas generating chamber).

According to a further embodiment of the present invention, the system for regulating or controlling pressure in the gas generating chamber used with the product bag of the present invention may include a first reactant and a pressure regulating mechanism that includes a tubular body which may be made of plastic and has a hollow portion. A second reactant and a gas are disposed within the hollow portion and check valves which permit flow in only one direction are disposed at either end of the tubular body. One (first) check valve is arranged so that one end of the tubular body is capable of receiving gas when the pressure surrounding the tubular body exceeds the pressure of the gas within the hollow portion and the other (second) check valve is capable of releasing the second reactant into the gas generating chamber when a pressure within the hollow portion exceeds a pressure surrounding the tubular body. These two check valves are both one way valves. Thus, no gas or reactant escapes from the first check valve and no gas or liquid penetrates into the hollow portion through the second check valve.

According to a still further embodiment of the present invention, the system for regulating pressure may include a tubular body which may be made of plastic with a hollow portion. A liquid reactant and a gas are disposed at each end of the hollow portion of the tube. Preferably, the ratio of the liquid reactant to the gas disposed in the hollow portion of the tube is approximately equal to that of the product in the container as compared to the remaining air space in the container. One or more holes are provided in the hollow portion of the tube, thereby providing a permeable access between the internal region of the tube and the area in which the tube is disposed. The size of the apertures and the type of the liquid reactant are selected so that a surface tension of the liquid reactant at the permeable holes will prevent a flow of liquid reactant into the region surrounding the tube when there is pressure equilibrium, i.e., when the pressure inside the tube is equal to the pressure outside of the tube. For example, when the reactant in the tube is a 50% solution of citric acid, an aperture of approximately 0.3 mm will give satisfactory results.

According to yet another embodiment of the invention, the hollow portion may include a separating means for assuring that, regardless of the orientation of the dispenser, the reactant disposed in the hollow portion is always between the permeable opening and the gas which is also enclosed in the hollow member. The separating means may include a diaphragm, a movable seal, preferably in the shape of a sphere, or a barrier such as a petroleum based grease or wax plug.

According to yet another embodiment of the present invention, the tubular body may be provided with one closed end and a second end covered with a bonded elastomeric film having one or more pierced openings through which liquid reactant and gas traverse to substantially maintain pressure equilibrium between the interior of the tubular body and the gas generating chamber.

It is also possible to use the product bag of the present invention in a system that does not have pressure regulation. More specifically, the system could be charged to high starting pressure which in turn sets a high initial spray rate. As product is dispensed, the spray rate may decline with the reduction of pressure within the container. One such system involves using a compressed gas in the container surrounding the product bag. As product is dispensed the gas compression reduces, thus lowering the spray rate. Another such system uses liquified gas propellants. Such gas propellants include liquified hydrocarbon gases. The product bag of the present invention provides an advantage in such a system because the barrier material is impervious to the pressurizing gas. Therefore, the gas cannot leak into the product bag and affect the product and furthermore be dispensed. The result is that an effective liquified gas propellant system is achievable with smaller amounts of gas than previously used in such systems.

BRIEF DESCRIPTION OF THE DRAWINGS

FIG. 4 illustrates a sealed product dispensing bag with a valve attached according to the embodiment of FIG. 1.

FIG. 5 illustrates a releasable seal for maintaining the product dispensing bag of FIG. 1 in a collapsed state prior to filling with product.

FIGS. 12A to 12F illustrate embodiments of flow tubes which can be included in the product dispensing bag of the present invention.

DETAILED DESCRIPTION OF THE PREFERRED EMBODIMENT

Figure 1A:
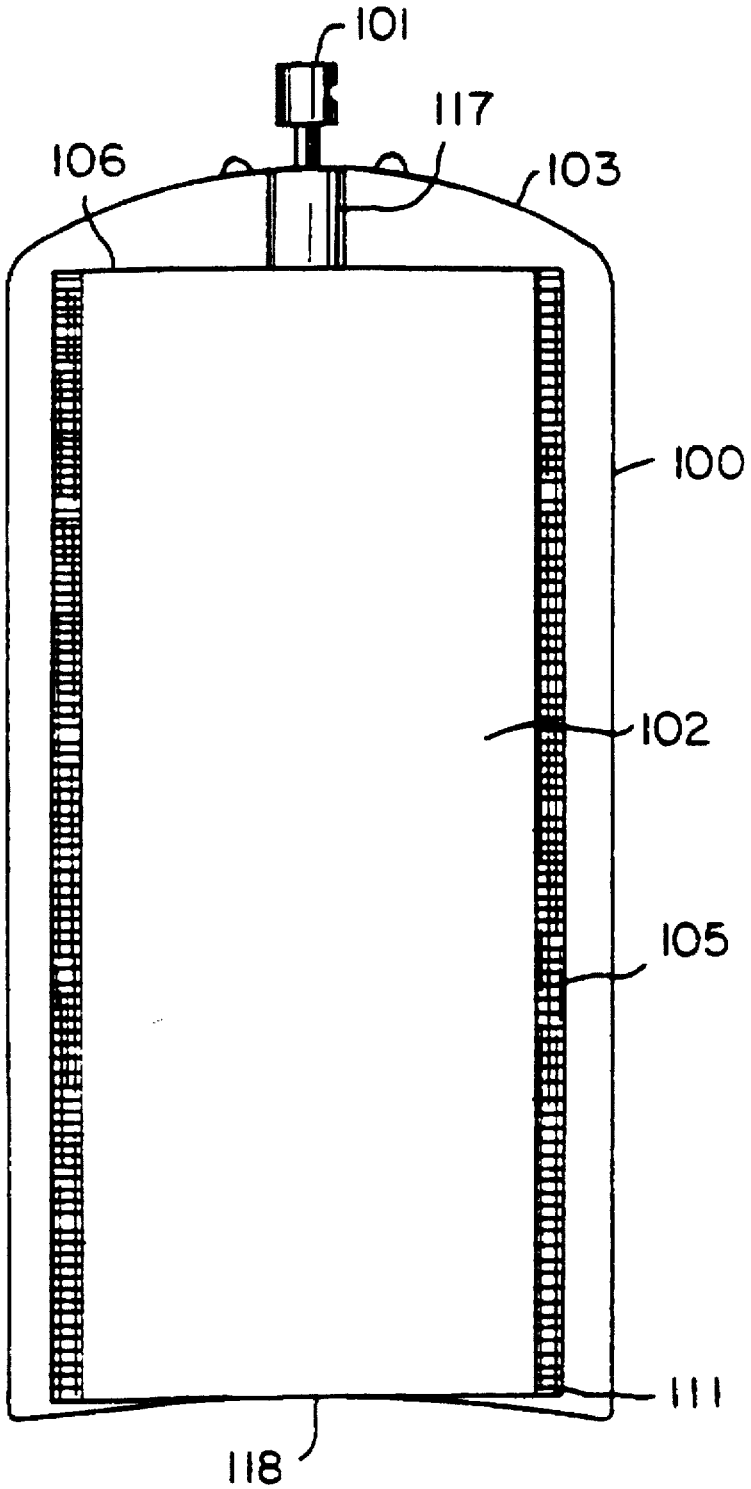
FIGS. 1A and 1B illustrate a dispensing container system incorporating a product dispensing bag according to one embodiment of the present invention.
Figure 1B:
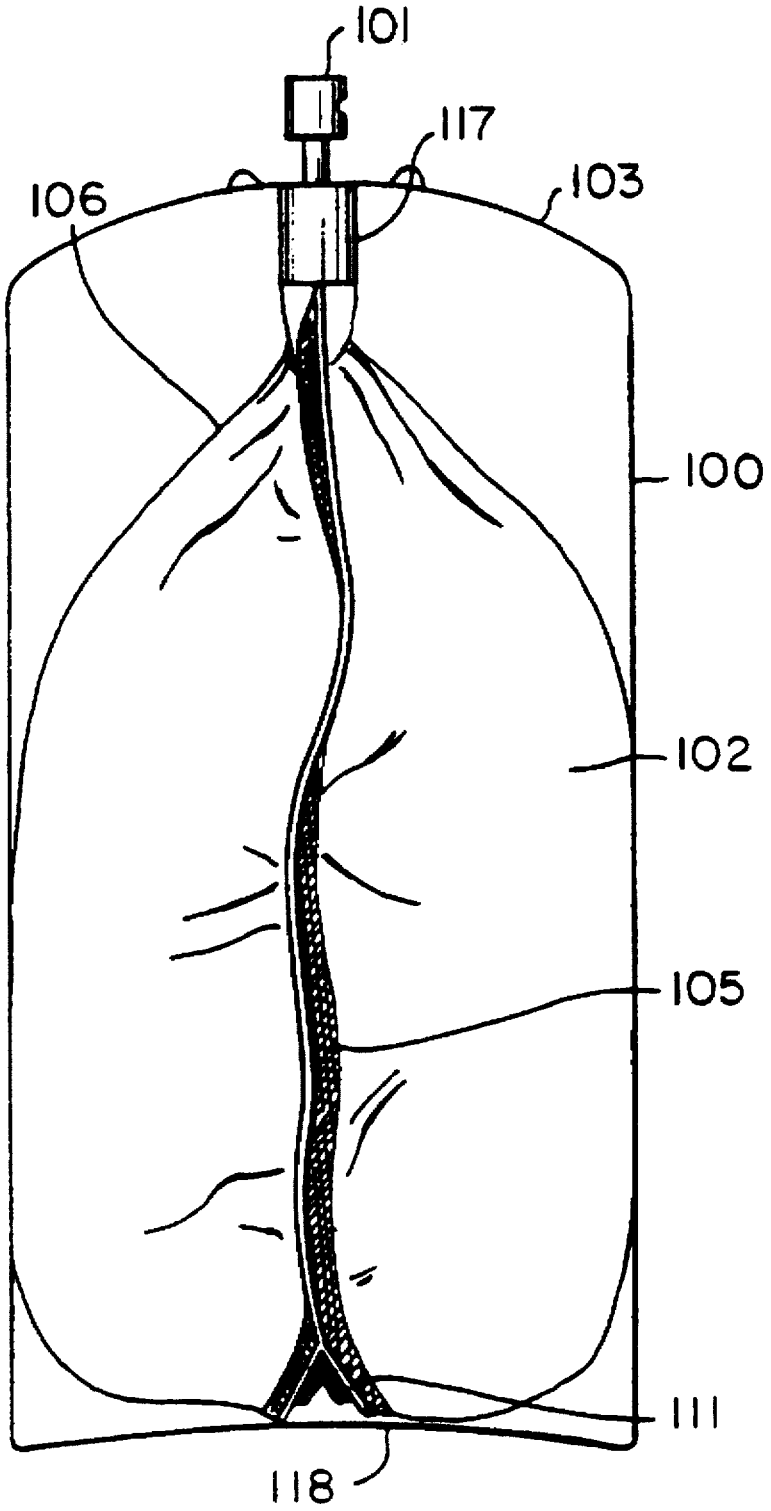

FIG. 1A illustrates a product dispensing system incorporating a product dispensing bag in accordance with an embodiment of the present invention. The system includes a container 100 having external wall surface 103. A product dispensing bag 102 has a gusseted bottom 111 and sealed side portions 105. The product dispensing bag 102 is also sealed around its top edge 106. A valve assembly 101 is attached to the product dispensing bag via a valve connector 117 extending into the top surface of the container. FIG. 1B illustrates a side view of the product dispensing bag showing the bag partially filled. The gusset 111 is opened and rests on the dome-shaped bottom 118.

After the container is sealed, product is injected into the product dispensing bag via the valve and valve connector. As the bag fills it expands and the gusseted portion spreads along the surface 118 of the bottom of the container. The gusset serves to prevent undue force on a seal between the valve 101 and the bag 102 when product is in the bag because the mass of the product rests on the bottom of the container rather than being supported by the bag/valve interface if the bag hangs in free space. The gusset controls the fill operation so that the bag fills more evenly and more fully. Furthermore, the gusset improves bag fill capacity for a given container size. Preferably the height of the gusset 111 (the distance between the bottom of the bag and the interior seam of the gusset) extends for approximately eighty percent (80%) of the radius of the container.

It is further necessary to provide a source of dispensing pressure in the container. One method and system for providing a dispensing pressure that is regulated is described below with reference to FIGS. 7 to 11. In another method, a gas chamber consisting of the region in the closed container surrounding the product bag, can be charged to an initial dispensing pressure. The precharge exerts pressure on the product dispensing bag 102 so that when the valve 101 is activated, product is forced from the bag and out of the container. Without regulation the pressure will steadily decline as product is dispensed. Such a precharge can be provided by using compressed gas in the container surrounding the product bag, or using a liquified gas propellant.

The product dispensing bag of the present invention is useful in any such dispensing systems.

Figure 2:
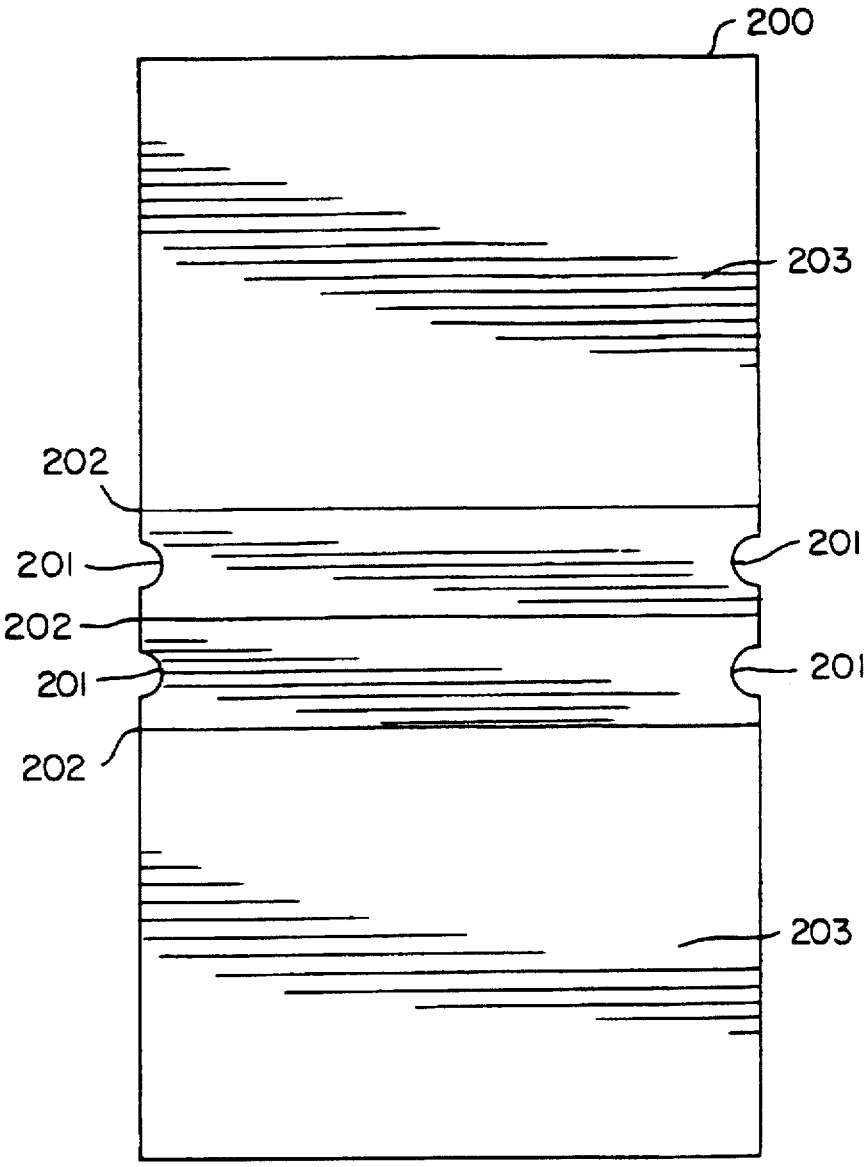
FIG. 2 illustrates material to be formed into a product bag to be utilized in a dispensing system in accordance with the present invention.

FIG. 2 illustrates a segment 200 of material for forming a product bag. The material may be a film that includes an aluminum or other gas barrier layers usually provided in the form of a continuous roll of such material. Once a segment 200 is cut from the roll, ear segments 201 are formed along a central portion, in a symmetric manner between folds 202. Segment portions 203 are then folded together to bring the side edges of these portions into contact. When doing this the ear segments 201 are aligned and the folds 202 form the gusset 111 of the bag. The center fold 202 forms the interior seam of the gusset. The side edges are heat sealed together to form the product bag. When the product bag is sealed, the ear segments cause the gusset to fold outward and allow the bag to rest on the base of the can while reducing stress on the seal area of the gusset.

Figure 13:
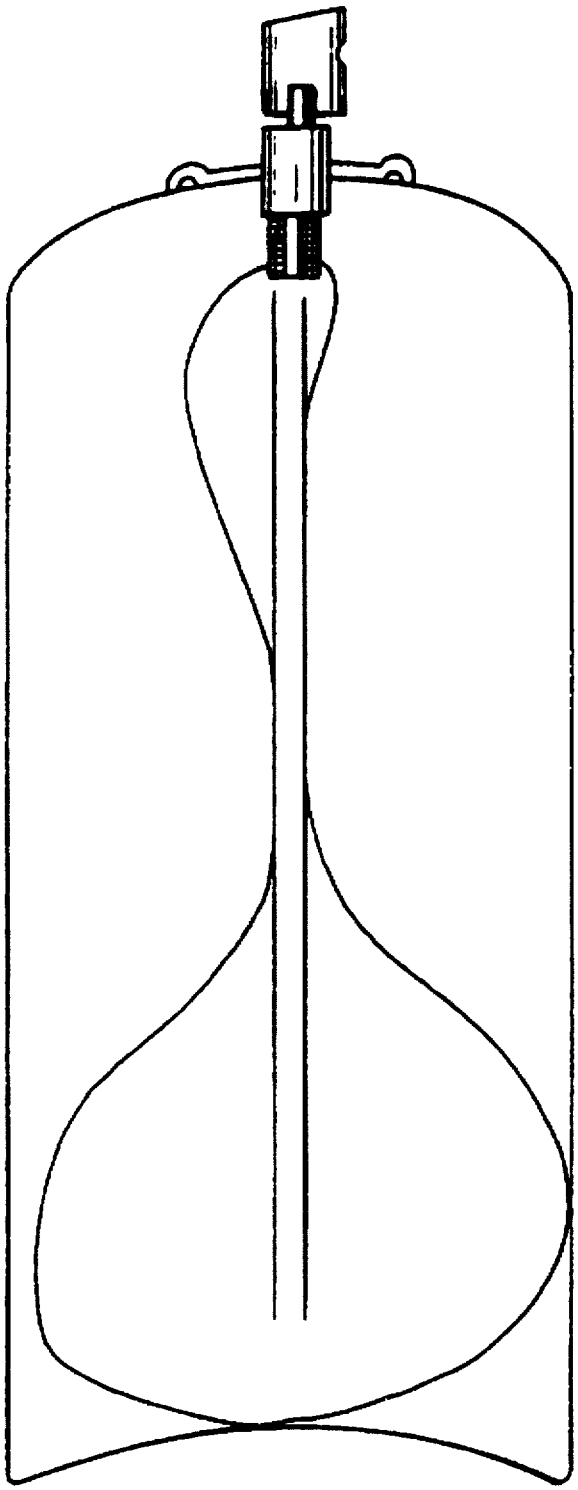
FIG. 13 illustrates an embodiment of the product dispensing bag of the present invention including a flow tube, in a product container.

At this point in the process of making the bag assembly, a flow device can be inserted into the bag. The flow device can extend substantially the full length of the bag. The flow device promotes product flow and increases evacuation percentages, especially for viscous products. Bags pressurized from the outside begin to collapse around their center after about 60% of the product has been dispensed. With viscous materials or for light structure bags this collapsing action can close the bag up, blocking the flow of product to the exit at the top of the dispenser. The flow device, positioned just below the bag exit, will maintain flow for materials trapped in both the top and bottom of the bag. The flow device can take many shapes, such as a tube (shown in side view in FIG. 12B and cross-section in FIG. 12E),) a ribbed strip (shown in side view in FIG. 12C and in cross-section in FIG. 12F), and a partially closed tube (shown in side view in FIG. 12A and in cross-section in FIG. 12D). FIG. 13 illustrates the flow device in the bag and shows how it can prevent the product bag from collapsing to close off the bottom portion of the bag. The flow device 1301 allows the product in the bottom portion of the bag to make its way to the dispensing valve even when the bag has begun to collapse.

Figure 3A:
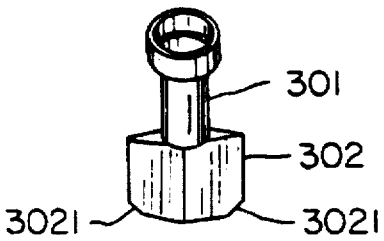
FIGS. 3A and 3B illustrate views of a valve connector for securing a dispensing valve to the product bag of FIG. 1.
Figure 3B:
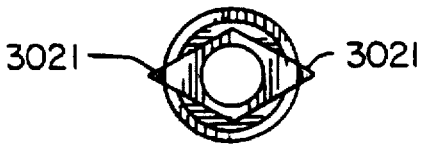

Before the product dispensing bag is completed, the valve assembly must be attached to the bag material and the bag must be completely sealed around the valve connection point. Standard valves may be used for the valve assembly. However, the present invention contemplates a unique wedge shaped connector providing an enhanced connection point for the bag and valve assembly. An embodiment of the wedge shaped connector is illustrated in FIGS. 3A and 3B.

Extension segment 301 connects the wedge 302 to the valve assembly, not shown. The wedge is inserted in the top portion of the bag and when the top edge of the bag is subjected to welding, the wedge material melts along its edges to fill in weak areas of the seal. As a consequence, the wedge, which is already firmly connected to the valve assembly, is also firmly connected to the interior of the bag with a secure seal. The material for the wedge connector and the product bag are selected to be compatible for sealing in a welding operation and may be made for example from a polypropylene, polyethylene or other suitable plastic Furthermore, the wedge has a unique diamond-like shape along its bottom surface. However, at side points 3021, the surface is sloped away from the bottom as is shown more clearly in FIG. 3A. This unique shape enhances the connection of the valve connector to the product dispensing bag and provides stress relief when the bag is filled with product. Moreover, the shape of the wedge is advantageous because it allows for adaptation of conventional bag making equipment.

FIG. 4 illustrates an embodiment of the product dispensing bag in its completely assembled state with valve assembly 402 attached and side edges 403 sealed. The present invention allows for easy deposit into a conventional size opening in the container. The insert includes a collapsed bag rolled into a tubular shape for ease of insertion. The bag is rolled, not from one side edge, but from the center of the bag outward to the side edge. The bag is kept in that condition by a releasable restraint member, an example of which is illustrated in FIG. 5. Restraint 500 is formed of a light paper with adhesive disposed along two of its edges 502. Preferably one of the adhesive edges 502 is in contact with one of the sealed side edges of the product dispensing bag. Restraint 500 is wrapped around the circumference of the rolled up bag to overlap on itself. A second adhesive edge is in contact with the top surface of the restraint 500 and is disposed over the first adhesive edge. The insert which is rolled from the center is now ready for placement within the container. The restraint 500 maintains the bag in its rolled, collapsed state until product is injected into the bag. At that time the injection pressure causes the restraint 500 to tear, thereby allowing the bag to expand in the container as product is injected To facilitate the tearing of the restraint 500, a slit 505 is provided before it is applied to the bag. As product is injected into the bag, the restraint 500 tears along the line formed by the slit. After the restraint is torn, the insert is rotationally unwound about its center which reduces stress on the valve bag interface at filling and thereby permits larger fill volumes.

Figure 6:
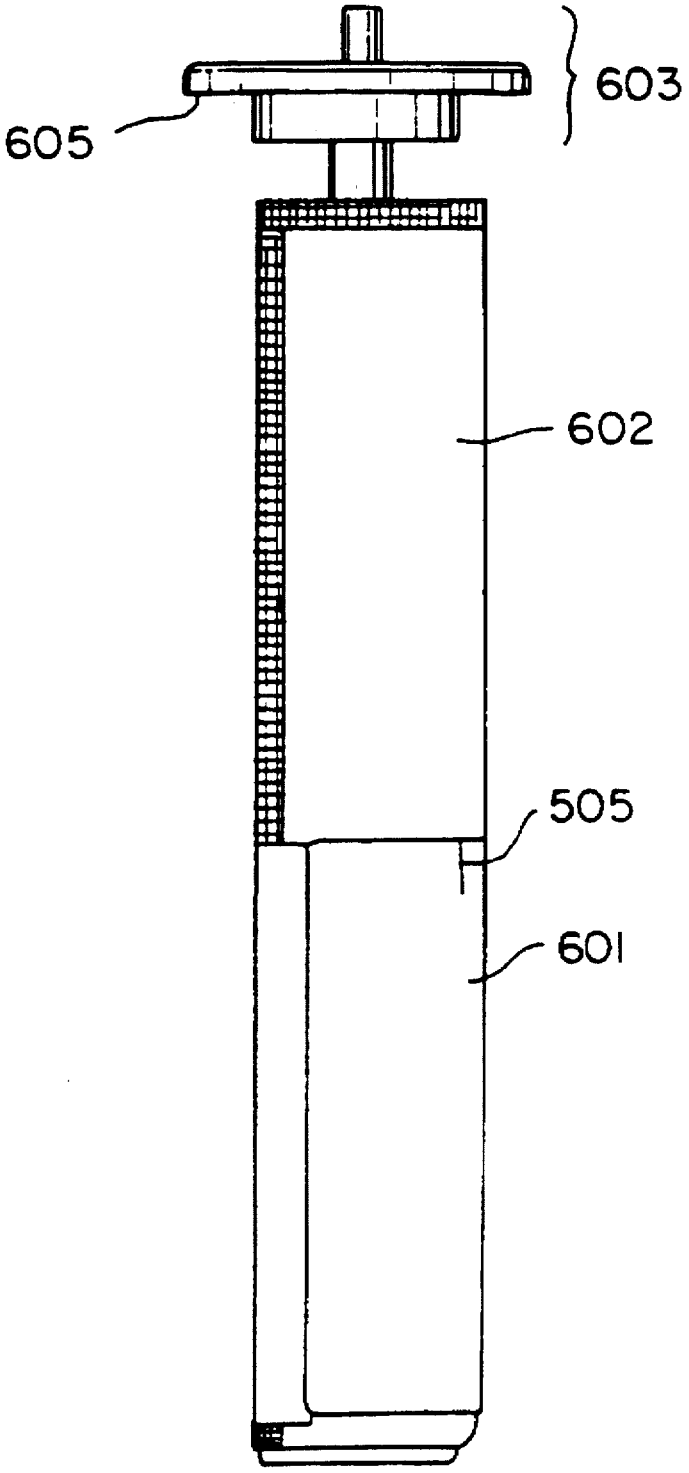
FIG. 6 illustrates a product dispensing bag of the embodiment of FIG. 1 prepared for insertion into a dispensing container.

FIG. 6 illustrates a completed bag/valve insert for placement in the container. The seal 601 wraps around the rolled product bag 602 to which the valve assembly 603, including the wedge (not shown) is attached. Once the insert is placed in the container, the bottom rim 605 of the valve assembly is sealed to the rim (not shown) of an opening in the top of the container.

It has also been determined that certain sizing relationships for the bag, the gusset, and the valve assembly further enhance the characteristics of the dispensing system. For example, the gusset length is preferably approximately equal to 80% of the radius of the can. The bag height should be approximately equal to the difference between the inside can height (from the top rim of the container to the top surface of the bottom dome) and the valve height. Preferably the material length is approximately equal the sum of twice the bag height and two times the gusset length.

FIGS. 7 to 11 illustrate one type of a dispensing system configuration wherein the product dispensing bag of the present invention is used with a pressure regulating mechanism. As described above, the product dispensing bag of the present invention can also be used in such systems as compressed gas or liquified hydrocarbon systems or any product-in-bag dispensing system where a pressure source surrounding the bag is used to force product out of the bag. A product bag 702 having a gusseted bottom is disposed within container walls 703. A gas generating chamber 704 is defined by the area bounded by the container walls 703 and the exterior of the product bag 702. A first reactant 707, such as sodium bicarbonate, is disposed in a bottom of the container in the gas generating chamber 704 and a pressure regulating mechanism 708 is also disposed in the gas generating chamber. The pressure regulating mechanism 708 includes a second reactant 709 which can be a liquid reactant such as citric acid. In one embodiment, the pressure regulating mechanism is a hollow tube having check valves 710 disposed at either end. When the second reactant 709 combines with the first reactant 707, gas is generated within the gas generating chamber 704. The pressure regulating mechanism 708 is designed so that when a pressure outside of the tube exceeds a pressure inside of the tube, gas enters into the tube until pressure equilibrium is established. When the pressure inside of the tube exceeds the pressure outside of the tube, the second liquid reactant 709 is forced from the tube into the gas generating chamber 704 so as to react with the first reactant 707 to thereby generate gas within the gas generating chamber and reestablish pressure equilibrium between the pressure inside of the tube and the pressure surrounding the tube. The pressure generated in the gas generating chamber 704 places the product bag 702 under pressure and hence also places the product disposed within the bag 702 under pressure as well. Thus, when valve 701 is activated so as to dispense product, product is dispensed from the container under pressure produced in the gas generating chamber.

While preferably sodium bicarbonate is used as the first reactant and citric acid as the second reactant, other reactants may be used. Also, solutions and slurry of the reactants may be used and the reactants may be interchanged if desired.

The pressure regulating mechanism system 708 will be described in greater detail below. However, the tube is designed in such a manner as to react with the first reactant 707 to maintain a substantially constant dispensing pressure throughout the dispensing of the entire product disposed in the product bag.

The initial pressure of the dispensing system is set when the product bag is filled. As product is introduced into the bag, the volume of the bag expands, thereby reducing the volume of the gas generating chamber to in turn increase the pressure within that chamber The increase in pressure of the chamber in turn results in an increase in the gas pressure within the pressure regulating mechanism 708. When the product bag has been filled with product, a specific pressure is set in the gas generating chamber 704 and a gas pressure is also set in the pressure regulating mechanism 708 as equilibrium is established between the pressure inside and the pressure outside of that mechanism. The initial pressure is determined in accordance with the amount of product fill in conjunction with a given can size. Whenever the pressure in the gas generating chamber drops due to the expulsion of product and the concomitant expansion of the volume of the gas generating chamber, the pressure regulating mechanism expels a predetermined amount of second liquid reactant 709 which mixes with the first reactant 707 and regenerates pressure to reestablish the initially charged pressure within the gas generating chamber. The amount of citric acid 709 discharged is determined by the pressure differential between the container and tube head space and the volume of gas in the tube. The act of filling the product bag activates the pressure regulating system, charging it to a dispensing pressure. The pressure regulating system further controls the dispensing pressure over the course of dispensing the product from the container.

Figure 7:
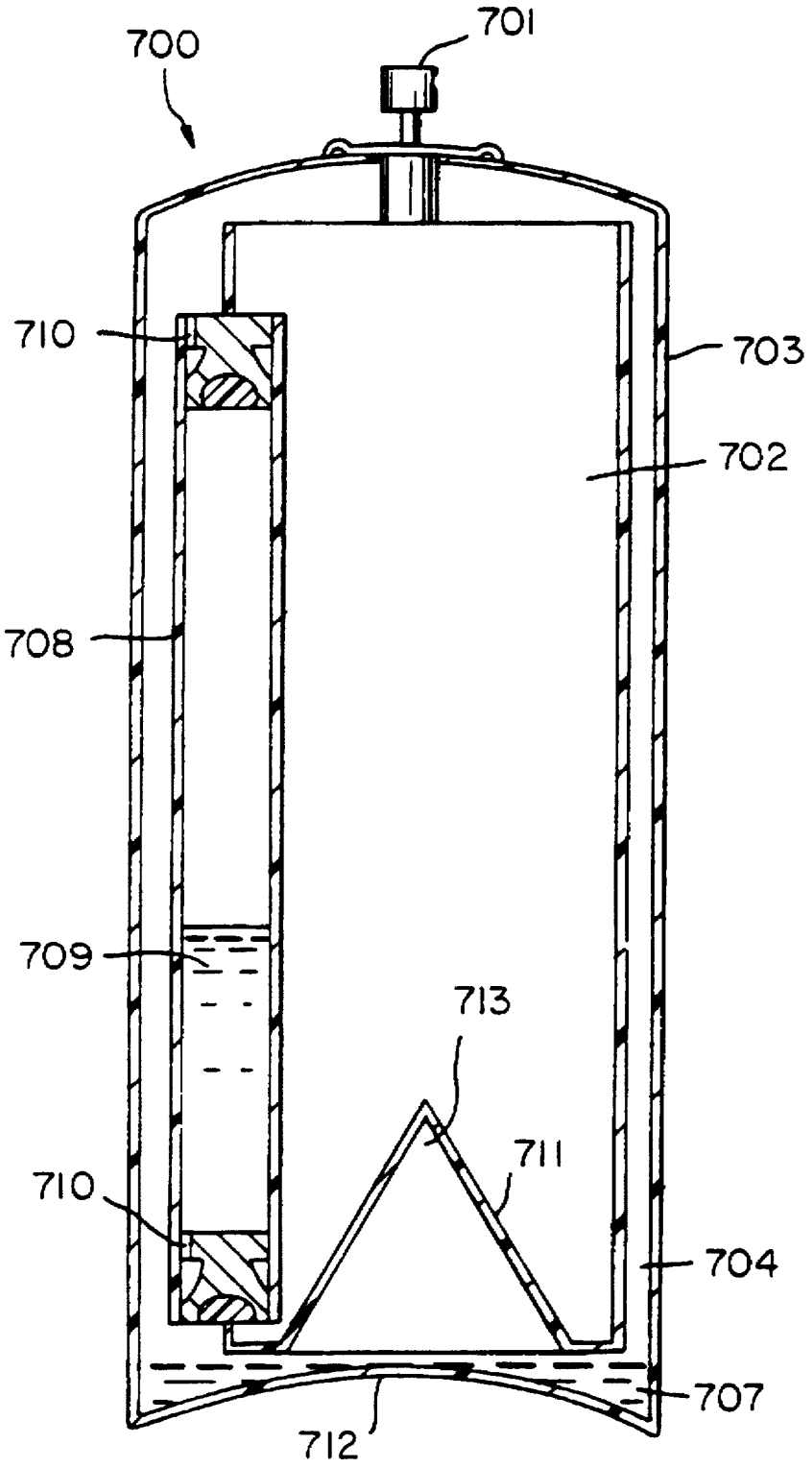
FIG. 7 illustrates a further embodiment of the present invention using the product dispensing bag of FIG. 1 in a system having a pressure regulating mechanism.

As shown in FIG. 7, the product bag has a gusseted end 711 and is a predetermined length dependent upon the container size. More specifically, product dispensing bag 702 is of a length such that the presence of product in the bag brings a base 713 of the gusset 711 into contact with the bottom 718 of the container 702 which may be dome shaped. The gusset serves to prevent undue force on a seal between the valve 701 and the bag when product is in the bag. Furthermore, the gusset improves bag fill capacity for a given can size. Preferably, the height of the gusset 711 (distance between the bottom of the bag and interior seam of the gusset) extends for approximately 80% of the radius of the container.

Figure 8B:
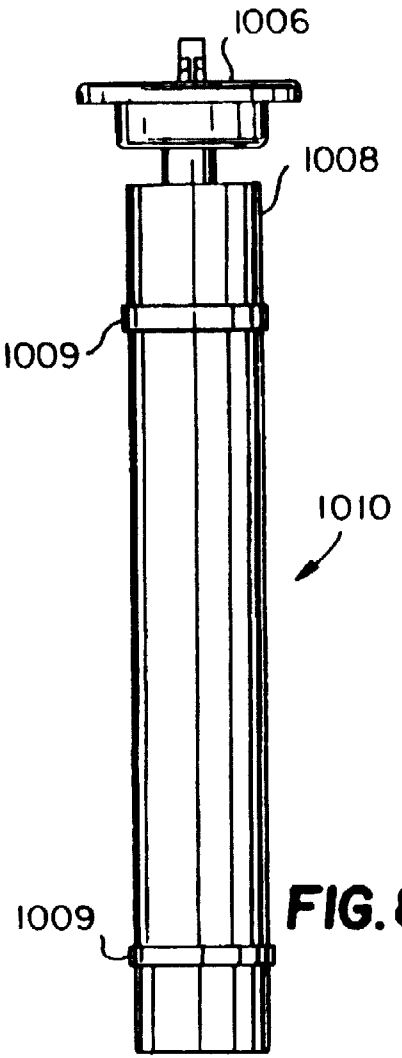
FIGS. 8A and 8B illustrate stages of producing an insert including the product dispensing bag and pressure regulator, which is to be placed in a dispensing container.
Figure 8A:
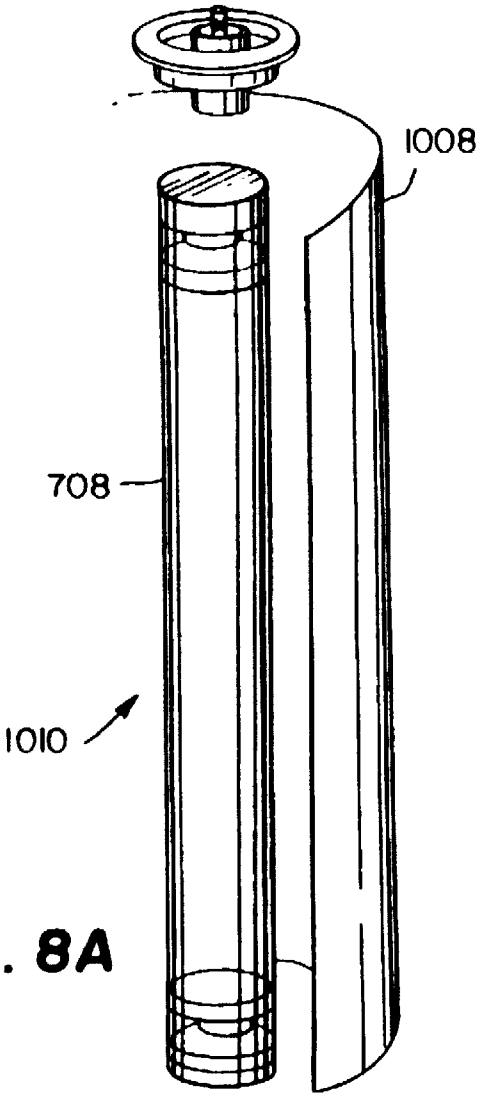

FIGS. 8A and 8B respectively, illustrate a method for producing an insert for a dispensing container where the insert includes not only the collapsed product dispensing bag, but also the pressure regulating mechanism. FIG. 8A illustrates product dispensing bag 1008 and pressure regulating mechanism 708. The bag 1008 may be rolled up starting at its center into a tubular shape as described above with respect to FIGS. 5 and 6 and the pressure regulating mechanism may be placed along side the product bag. The tube-like structure may be initially constrained by means 1009 (such as an adhesive band or dots) as shown in FIG. 8B. It is further possible to, employ the releasable restraint described above with respect to FIG. 5. Thus, the insert 1010 is easily insertable into a dispenser container along a dispensing container assembly line.

A dispenser container may be brought to an insertion station and the inserts placed into dispensers which may then be sealed. Subsequently, product is injected into the product bag 1008 through the valve 1006. Placing product in the bag 1008 through valve 1006 in the filling operation releases the restraining member 1009 to allow the bag to expand to receive additional product. As described above, the filling of the bag also results in activation of the pressure maintenance system.

The fact that the pressure regulating system is not activated until the product bag is filled permits a number of shipping options. First, a completed product dispenser, with product, may be shipped and in this form the dispensing pressure has already been determined. Another option is to ship a container with a pressure regulating system installed but without product. When product is later added, the dispensing pressure is then set. Another alternative is to ship the bag/pressure regulating mechanism insert of FIGS. 8A and 8B. The insert can then later be placed into a container. As another alternative, the pressure regulating mechanism may be shipped separately. Also the product dispensing bag may be shipped separately, especially when no pressure regulator like that disclosed above is to be used.

The details of a number of embodiments of the pressure regulating mechanism will now be described with reference to FIGS. 9A to 11.

EXAMPLE 1

Figure 9A:
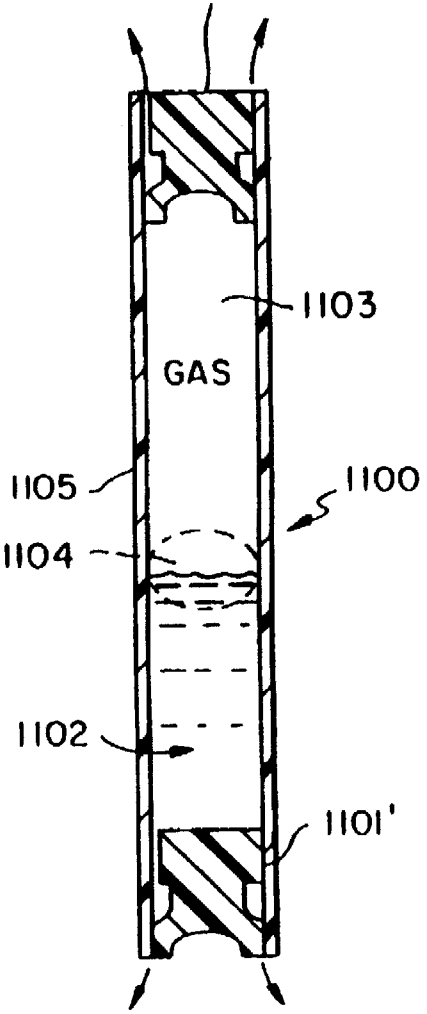
FIGS. 9A and 9B illustrate two arrangements of an embodiment of a tubular member having different valve configurations as a pressure regulating mechanism which is adapted to be inserted into a dispensing container and provide a dispensing system in accordance with the present invention.

FIG. 9A illustrates a first embodiment of the pressure regulating mechanism to be utilized in the dispensing system of the present invention The pressure regulating mechanism 1100 includes a hollow tube-like member 1105 having check valves 1101 and 1101' (which are one way valves) disposed at the ends of the tube 1105. Check valve 1101 is oriented so that gas can enter into the hollow tube 1105 along the side walls of that check valve and enter into the gas portion of the hollow tube chamber 1103. This occurs when the pressure outside of the pressure regulating mechanism 1100 exceeds the pressure within the pressure regulating mechanism and continues until a pressure equilibrium state is established, at which time there is no flow of gas into the pressure generating system 1100.

The other check valve 1101' is oriented in the hollow tube so that a liquid reactant 1102 is released from the tube when the pressure inside of the tube 1105 exceeds a pressure outside of the tube. However, no reactant or gas is able to enter into the tube through valve 1101'. These two one-way valves, 1101 and 1101', together with the tube and reactants, which, in conjunction with the pressure generating chamber of the dispensing container define a pressure regulating system, comprise a true pressure feedback system. In particular, once the pressure regulating system is charged by the filling of the product bag which establishes an initial pressure in the gas generating chamber, the pressure regulating tube reaches its initial pressure state upon establishing a pressure equilibrium with the gas generating chamber. When product is dispensed, the pressure in the gas generating chamber reduces due to the expansion of the volume and the pressure change results in the release of the liquid reactant 1102 into the gas generating chamber so as to combine with the first reactant in the dispensing container. The two reactants combine to produce gas and the gas pressure in the gas generating chamber increases. With the proper metering of the amount of liquid reactant released from the tube, it is possible to control the gas generation in the gas generating chamber so as to re-establish the initial pressure of the pressure maintenance system. The control of gas generation is dependent on a number of factors, such as the concentration of the two reactants and the check valve configuration which affects the opening pressure of the check valves. Thus, the gas generating chamber will resume the initial pressure and the product in the product bag is under substantially the same pressure after some product is dispensed as it was when originally filled. This operation continues until all of the product is dispensed from the bag.

The pressure regulating mechanism of the above-configuration can operate over a wide range of dispensing container orientation with respect to an upright position. However, the inclusion of a low friction, gas tight, movable seal 1104 between the has 1103 and liquid 1102 will permit the device to operate in any possible orientation without performance degradation.

Figure 9B:
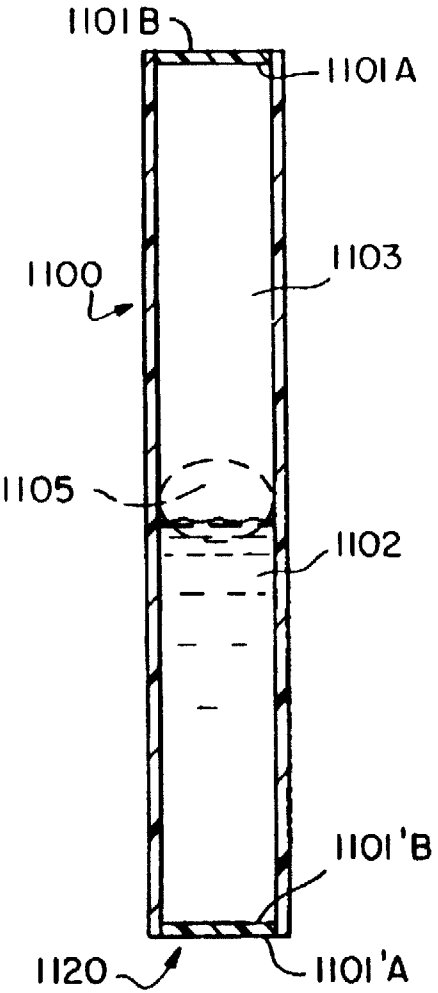

FIG. 9B illustrates another pressure regulating mechanism which utilizes a different technology to achieve the same result as the check valves of FIG. 9A. In the arrangement of FIG. 9B, the check valves are replaced by thin film configurations. In particular, valve 1101 is replaced by a first elastomeric film 1101A disposed over a first end of the tube and a first semi-rigid or non-elastic film 1101B disposed over the first elastomeric film. One or more holes are pierced through the first semi-rigid film and first elastomeric film. At rest, the holes in the elastomeric film are closed by the elastic nature of the film and the pierced nature of the holes. At a second end of the tube, replacing valve 1101', are a semi-rigid film 1101'B over the end and a second elastomeric film 1101'A over the semi-rigid film. One or more holes are pierced through these latter two films with the same at rest state resulting.

The semi-rigid films define the direction in which the associated elastomeric film can move as the result of applied pressure. At the first end, the first semi-rigid film allows the first elastomeric film to be responsive to a pressure differential in which a pressure in the gas generating chamber exceeds a pressure in the tube. Under this condition, the holes of the first semi-rigid and first elastomeric film are opened and gas passes into the tube until a pressure equilibrium is established. However, if a pressure inside of the tube exceeds that outside of the tube, the first semi-rigid film acts as a backing that prevents movements of the first elastomeric film thereby preventing the opening of the pieced holes in the elastomeric film. Thus, the configuration corresponds to check valve 1101.

The second semi-rigid film and second elastomeric films use the same principles to perform the functions of valve 1101'. In particular, when the pressure inside the tube is greater than that in the gas generating chamber, the second elastomeric film expands outward, opening the pierced holes such that reactant 1102 is discharged into the gas generating chamber. When pressure outside the tube exceeds that inside of the tube, the second semi-rigid film prevents movement of the second elastomeric film, thus preventing the opening of the pierced holes in that film.

In summary, the semi-rigid/elastomeric film configurations of FIG. 9B are analogous to the check valves 1101 and 1101' of FIG. 9A.

For both of the embodiments of Example 1, the moveable seal between the gas and the liquid reactant may, for example, be a grease plug made of petroleum jelly.

It has been determined that the ratio of gas or headspace to liquid reactant in the tube is important. In this regard, it has been determined that the ratio of gas headspace 750 of FIG. 7 to liquid reactant 709 in the tube 702 should be correlated to the ratio of the non-product containing portion of the container (airspace) to product fill within the container.

For example, total volume in a can may be 295 cc. A 70% product fill in such a can is approximately 200 cc. In such an embodiment, it has been found that a pressure regulating mechanism having a total volume of about 8.5 cc is effective for accomplishing pressure regulation. Of that volume, suitable pressure regulation is achieved with a gas or headspace volume preferably between 2 cc and 4 cc. In such a pressure regulating mechanism, optimum results are achieved when approximately 4.5 cc is liquid reactant. 3 cc is the headspace gas and the movable plug is 1 cc. In general, it has been found that a ratio of headspace gas to liquid should be approximately equal to a ratio of air space in the container to product fill.

Another significant concept related to initializing of the container is the idea of pressure enhancement. This is useful for those cases where the amount of product to be provided in the dispenser to start is lower than is necessary to generate the initial dispensing pressure in accordance with the Boyle's law. In those circumstances it is beneficial to partially increase the pressure in the container before the act of filling. For example, in an aerosol can having an empty volume of 335 ml (assuming a volume of 26 ml for the valve, bag, pressure regulator and reactant) a product fill of 239 ml into the product dispensing bag will raise the can pressure from 0 psig to 50 psig. In contrast if for some reason the product fill is limited to 200 ml, then without enhancing, the pressure would rise from 0 psig to 26 . If, however a pressure increase of 8.1 psig was provided to the container before filling with product, the desired 50 psig would be obtained. The manner in which the pressure enhancement is performed, i.e., the manner of prepressuring the container may be accomplished by anyone skilled in the art and can be performed either before or after product has been added.

EXAMPLE 2

Figure 10:
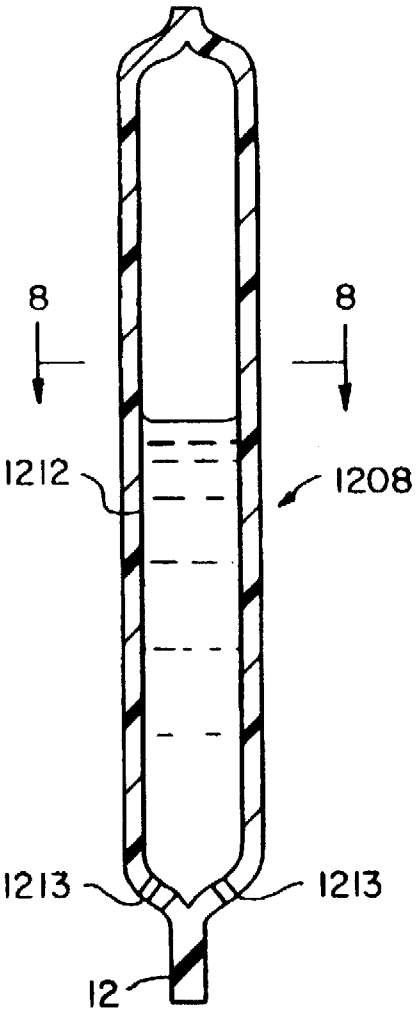
FIG. 10 depicts a side cross-sectional view of a first arrangement of another embodiment of a tubular member in the apparatus of the invention.

FIG. 10 illustrates another embodiment of the pressure regulating mechanism 1208 in the apparatus of the present invention. The embodiment includes a tube-like structure having a hollow portion 1212 including one or more permeable openings or apertures 1213. The number of openings is dependent upon the viscosity of a second reactant 1214 disposed within the hollow portion 1212 and typically will be between 1 to 4. A gas is also disposed in that portion of the mechanism 1208. The second reactant 1214 and the size of the apertures are selected so that at a pressure equilibrium where the pressure outside of the tube is equal to the pressure inside of the hollow portion of the tube, the liquid does not flow out of the tube regardless of its orientation with respect to the vertical plane. Stem portion 12 is provided so that the apertures 1213 remain above a first reactant disposed in the gas generating chamber into which the pressure regulating mechanism 1208 is inserted. Separating the aperture from the first reactant prevents the flow of liquids into the tube from the pressure generating chamber when such a pressure condition exists and only permits gas to flow into the tube when the pressure outside of the tube exceeds the pressure inside of the tube. The second reactant 1214 and gas are selected so that the gas (as it permeates the aperture into the hollow portion) percolates through the second reactant and a pressure equilibrium is approached. The hollow portion of the tube may have an inside diameter of 7 to 12 millimeters. The walls of the tube may be composed of any economical non-reactive material such as, for example, polyethylene or polypropylene. One to four holes ma be provided as the apertures or permeable openings, each hole having a diameter of approximately 0.3 millimeters for typical reactants. The second reactant 1214 may be composed of a 50% solution of citric acid.

As described above, the act of filling the product bag produces a starting pressure equilibrium in the product dispenser of 50 psig, for example. When the product dispenser is activated so as to dispense product, a reduced pressure, 45 psig, for example, in the gas generating chamber will typically occur. At that point, the gas inside of the hollow tube member is at a pressure of about 50 psig which exceeds the pressure in the gas generating chamber, about 45 psig. Therefore, in an effort to re-establish a pressure equilibrium, the gas in the tube applies its pressure to the second reactant 1214 in the tube. The pressure differential overcomes the surface tension of the reactant with respect to the apertures or permeable openings 1213. Based upon the pressure differential and the headspace in the tube a specific amount of reactant 1214 is metered into the first reactant in the gas generating chamber. Upon mixing of the two reactants, gas is formed, thus regenerating pressure in the gas generating chamber typically to between 48 and 52 psig when a new equilibrium is established in the hollow tube. Thus, a dispensing pressure in the gas generating chamber is re-established. So long as enough liquid reactant is provided in the hollow tube member, this pressure regulating system will be capable of substantially re-establishing the initial dispensing a pressure after every occurrence of dispensing, until all of the product is dispensed from the product pouch.

Figure 11:
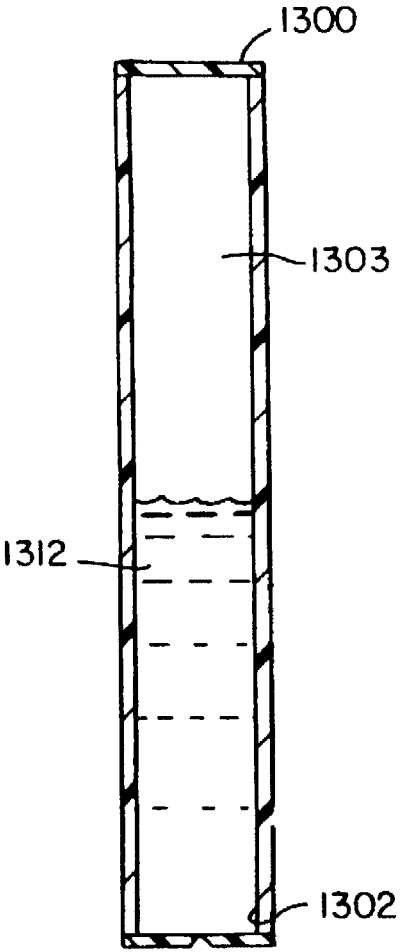
FIG. 11 depicts a side cross-sectional view of a second arrangement of the FIG. 10 embodiment of the tubular member in the apparatus of the invention.

FIG. 11 illustrates another arrangement of the embodiment of FIG. 10 where the apertures of the tube are replaced with thin film technology. In particular, a top end of the tube is sealed by a semi-rigid film 1300. The seal can be heat sealed, ultrasonic welded or laser welded, for example. But other seals are also usable. A bottom of the tube is covered by a bonded elastomeric film 1302 with one or more pierced holes. The elastomer can be a rubber material like that used to make balloons. If a needle like device is used to pierce the material (as opposed to cutting or burning a hole) the hole will close up when the needle is removed. This embodiment will work in the same manner as the embodiment in FIG. 10, with the added benefit of being able to control to a greater degree the passage of liquid 1312 or ga 1303 through the opening. The hardness of the rubber, the thickness of the rubber and the size of the piercing needle are factors that determine the valve opening pressure that is built into the device. The effect is to require a certain pressure differential across the membrane before the membrane will stretch enough to pass liquid or gas. In the un-stretched condition, the hole is closed. This approach makes the device less sensitive to shock and vibration and to temperature cycles.

The configurations of FIGS. 10 and 11 are workable from an orientation of 90° from the horizontal to approximately 5° from the horizontal. However, if the container is up-ended so as to turn it upside down during dispensing, then the gas of the tube will be in contact with the permeable opening and the liquid reactant will be disposed at an end of the tube removed from the apertures. In such a case, when the pressure inside the tube exceeds that outside the tube, as in spray down, the gas inside the tube will seep out of the permeable openings in an attempt to establish pressure equilibrium. No liquid reactant will be forced out of the tube. As a result, the device may not be capable of regenerating the initial or starting dispensing pressure.

Methods for compensating for the possibility that the dispenser will be moved through various orientations during use, are illustrated in FIGS. 9A and 9B and furthermore are disclosed in copending U.S. application Ser. No. 07/692,682, the disclosure of which is hereby incorporated by reference and U.S. Pat. Nos. 5,035,357 and 5,040,704.

In FIGS. 9A and 9B, a cylindrical plug is shown with a dashed line representation. This plug is designed to fit tightly but movably along an inner circumference of the tube. Thus, the plug always maintains the second reactant oriented so as to be in contact with the end of the tube that discharges that reactant, i.e., the check valve 1101' and pierced holes at end 1120.

The present invention provides a unique configuration for a product dispensing bag and also provides unique combination of such a product bag with a mechanism for regenerating pressure within the product dispenser's that the initial dispensing pressure may be re-established. The configuration provides a simple and reliable structure for regulating the system pressure.

It should be understood by one of ordinary skill in the art that different solutions of reactants can be utilized in the apparatus of the present invention. Furthermore, aperture size and hole size can be adjusted based on the surface tension or the viscosity of the reactant which is to be utilized in the pressure regulating mechanism. Furthermore, the size of the gas bubble and the size of the tube itself may be varied depending on its intended use in a product dispensing environment.

There are a number of advantages to the dispensing system of the present invention. The product in the bag configuration in the present invention provides a bag with improved fill capacity, reduced stress on the bag valve assembly and improved evacuation in terms of a reduction in the amount of product left in the dispenser at the end of use. Also, the use of the barrier material permits use of a dispensing pressure differential method relying on reduced amounts of liquified hydrocarbons. The valve connector provides a more secure connection between the bag and valve connector. This product dispensing bag is also useful in systems employing compressed gas to provide the dispensing force or in other product in bag configurations as well.

The present invention also provides advantages over known product in bag systems in that it can permit a can fill of about 70% or higher because it is the fill which determines the starting pressure in the dispensing system rather than a pressurized gas as in most product bag systems. In most such systems (for example) the starting pressure must be as high as 170 psig in order to have a 50 psig final pressure. This is not necessary in the dispensing system of the present invention where the present regulating system eliminates the need for a high starting pressure.

When a lower starting pressure is realized, this allows use of a thinner can wall rather than those that are used in prior product in the bag system.

The dispensing system of the present invention also provides the following advantages. The system provides the capability of choosing a starting pressure depending upon the amount of product fill in the product bag together with a given can size and product bag size.

The dispensing system of the present invention may use off the shelf actuators which are cheaper and less prone to clogging than special units designed for wide range of pressure in the dispensing of the product.

These and other benefits of the unique valve/bag interface and dispensing system configuration of the present invention will be apparent to those of ordinary skill in the art based on the description of the present invention provided in the specification and the associated drawings.

What is claimed is:

1. A product dispensing bag assembly for use in a product dispensing system, comprising:

a valve assembly including a two way valve, a valve extender connected to said two way valve and a wedge shaped connector connected to said valve extender;

a product bag including a continuous sheet of gas impervious material having a barrier layer folded along three lines in [its] *a* center portion to form a gusset, wherein the wedge shaped connector is engaged with a top side edge of the bag and *the top side edge of the bag is* sealed along [its outside] *side* edges *of the wedge shaped connector*, such that the wedge shaped connector is welded to [the] *an* inside wall of the bag.

2. The assembly of claim 1 wherein said barrier layer is an aluminum barrier layer.

3. The assembly of claim 1 wherein the wedge shaped connector includes a diamond shaped bottom surface *having corners* with sloped surfaces adjacent two of the corners of the diamond.

4. An insert for a product dispenser comprising:

a valve assembly including a two way valve, a valve extender connector to said two way valve and a wedge shaped connector connected to said valve extender;

a product bag including a continuous sheet of gas impervious material folded along three lines in [its] *a* center portion to form a gusset, wherein the wedge shaped connector is engaged with a top side edge of the bag and *the top side edge of the bag is* sealed along [its outside] *side* edges *of the wedge shape connector*, such that the wedge shaped connector is welded to [the] *an* inside wall of the bag, wherein the product bag is placed in a collapsed state; and a releasable restraint attached [along one of its edges] *at an edge of said restraint* to said product bag and extending around [the] *a* circumference of the product bag so as to overlap and adhere to itself, thereby maintaining the product bag in a collapsed state.

5. The insert of claim 4 wherein the releasable restraint comprises light paper having adhesive disposed along two side edges and a slit formed in a central region of the restraint, said restraint tearing along a weak point formed by said slit when product is injected in the product bag.

6. The insert of claim 4 further comprising a pressure regulating mechanism adjacent said product bag in its collapsed state and disposed within the circumference of the product bag when in its rolled state.

7. The insert of claim 6 wherein the releasable restraint comprises light paper having adhesive disposed along two side edges and a slit formed in a central region of the restraint, said restraint tearing along a weak point formed by said slit when product is injected in the product bag.

8. A product dispensing system comprising:

a container;

a product bag assembly insert including, a valve assembly including a two way valve, a valve extender connected to said two way valve and a wedge shaped connector connected to said valve extender; a product bag including a continuous sheet of gas impervious material folded along three lines in [its] *a* center portion to form a gusset, wherein the wedge shaped connector is engaged with a top side edge of the bag and *said top edge of the bag is* sealed along [its outside] *side* edges *of said wedge shaped connector*, such that the wedge shaped connector is welded to [the] *an* inside wall of the bag, wherein the product bag is placed in a collapsed state; and a releasable restraint extending around [the] *a* circumference of the product bag and restraining the product bag in a collapsed state; and a pressure regulating mechanism including a hollow tubular body disposed in the container adjacent a first reactant and containing a second reactant and gas within the tubular body, wherein upon mixing said first and said second reactants generate gas in the container surrounding the product bag and said second reactant is forced from the tubular body into contact with the first reactant when a pressure in the tubular body exceeds a pressure in [the] *an* area of the container [surrounding] *that surrounds* the product bag.

9. The dispensing system of claim 8 wherein injection of product into the product bag via the valve assembly releases the releasable restraint allowing the product bag to expand, and furthermore sets a starting dispensing pressure for the system, which pressure is thereafter maintained by said pressure regulating mechanism.

10. The dispensing system of claim 9 [herein] *wherein* the releasable restraint comprises light paper having adhesive disposed along two side edges and a slit formed in a central region of the restraint, said restraint tearing along a weak point formed by said slit when product is injected in the product bag.

*11. A product dispensing bag assembly for use in a product dispensing system, comprising:*

*a valve assembly including a two way valve, a valve extender connected to said two way valve and a wedge shaped connector connected to said valve extender, said connector including a diamond shaped bottom surface having corners with sloped surfaces adjacent two of the corners of the diamond; and*

*a product bag of gas impervious material having a barrier material and having top, side and bottom edges, wherein said wedge shaped connector engages the top edge of the bag wherein said wedge shaped connector is welded to an inside wall of the bag.*

*12. The assembly of claim 11 wherein said product bag comprises a continuous sheet of said gas impervious material folded along a center portion and sealed along three edges.*

*13. The assembly of claim 11 wherein said barrier material is an aluminum barrier layer.*

*14. The assembly of claim 12 wherein said barrier material is an aluminum barrier layer.*

*15. An insert for a product dispenser comprising:*

*a valve assembly including a two way valve, a valve extender connected to said two way valve and a wedge shaped connector connected to said valve extender; and*

*a product bag of gas impervious material having a barrier material and having top, side and bottom edges, wherein said wedge shaped connector engages the top edge of the bag and is welded to an inside wall of the bag, wherein the product bag is placed in a collapsed state; and*

*a releasable restraint attached along an edge of said restraint to said product bag and extending around a circumference of said product bag so as to overlap and adhere to itself, thereby maintaining the product bag in a collapsed state.*

*16. The insert of claim 15 wherein said releasable restraint comprises a light paper having adhesive disposed along two side edges and having a region susceptible to tearing to release said restraint when product is injected into the product bag.*

*17. The insert of claim 16 wherein said region susceptible to tearing comprises a slit formed in a central region of said restraint.*

*18. The insert of claim 15 wherein said product bag comprises a continuous sheet of said gas impervious material folded along a center portion and sealed along three edges.*

*19. The insert of claim 15 wherein said wedge shaped connector includes a diamond shaped bottom surface having corners with sloped surfaces adjacent two of the corners of the diamond.*

*20. The insert of claim 4 wherein said releasable restraint comprises a light paper having adhesive disposed along two side edges and having a region susceptible to tearing to release said restraint when product is injected into the product bag.*

* * * * *

UNITED STATES PATENT AND TRADEMARK OFFICE

CERTIFICATE OF CORRECTION

PATENT NO. : Re. 35,540

DATED : June 24, 1997

INVENTOR(S) : Robert J. DAVIES et al.

It is certified that error appears in the above-identified patent and that said Letters Patent is hereby corrected as shown below:

| Column | Line | |
|---|---|---|
| 4 | 26 | Before "high" insert --a--. |
| 10 | 23 | Change "orientation" to --orientations--. |
| 10 | 25 | Change "has" to --gas--. |
| 11 | 32 | After "with" delete "the". |
| 14 | 38 | Change "connector" to --connected--. |

Signed and Sealed this

Seventeenth Day of March, 1998

Bruce Lehman

*Attest:*

*Attesting Officer*

BRUCE LEHMAN

*Commissioner of Patents and Trademarks*